(12) United States Patent
Iwata et al.

(10) Patent No.: US 7,857,567 B2
(45) Date of Patent: Dec. 28, 2010

(54) BOLT-NUT FASTENING MECHANISM

(75) Inventors: Kiyotaka Iwata, Tokyo-To (JP); Kazuki Kitai, Atsugi (JP)

(73) Assignees: Iwata Bolt Kabushiki Kaisha, Tokyo-To (JP); Nissan Motor Co., Ltd., Kanagawa-Ken (JP)

( * ) Notice: Subject to any disclaimer, the term of this patent is extended or adjusted under 35 U.S.C. 154(b) by 534 days.

(21) Appl. No.: 10/571,840

(22) PCT Filed: Sep. 14, 2004

(86) PCT No.: PCT/JP2004/013358

§ 371 (c)(1),
(2), (4) Date: Mar. 15, 2006

(87) PCT Pub. No.: WO2005/028287

PCT Pub. Date: Mar. 31, 2005

(65) Prior Publication Data

US 2007/0041808 A1    Feb. 22, 2007

(30) Foreign Application Priority Data

Sep. 17, 2003    (JP) .............................. 2003-324972

(51) Int. Cl.
*F16B 43/02* (2006.01)
(52) U.S. Cl. ....................... 411/546; 411/433
(58) Field of Classification Search ................ 411/546, 411/432, 178, 535, 433, 307–310, 304
See application file for complete search history.

(56) References Cited

U.S. PATENT DOCUMENTS

| 2,135,637 | A | * | 11/1938 | Gade | ........................... | 411/311 |
| 3,176,746 | A | * | 4/1965 | Walton | ........................ | 411/259 |
| 3,294,139 | A | * | 12/1966 | Preziosi | ....................... | 411/303 |
| 3,554,258 | A | * | 1/1971 | Duffy | ........................... | 411/301 |

(Continued)

FOREIGN PATENT DOCUMENTS

DE    42 28 625    3/1994

(Continued)

OTHER PUBLICATIONS

Patent Abstract of Japan Publication No. 08-128430 Published May 21, 1996.

(Continued)

*Primary Examiner*—Gary Estremsky
(74) *Attorney, Agent, or Firm*—Ladas and Parry LLP

(57) ABSTRACT

Clearance can be secured, the thrust of a bolt provided with a left-hand external screw thread is stabilized and the costs of component members are reduced in attaching a steering member to a body frame. A bolt-and-nut fastening mechanism includes a right-hand bolt 4 provided with a metal-to-metal contact locking mechanism 7 on a threaded part, a left-hand bolt 5 provided with an internal screw thread 8 with which the bolt engages, and a fixing nut 6 capable of engaging with the left-hand screw thread 9 of the left-hand bolt 5 or a member 14 provided with an internal screw thread with which the left-hand screw thread 9 of the left-hand bolt 5 engages. The locking mechanism 7 of the bolt 4 thrusts the left-hand bolt 5 forward so that the gap between the top surface 13 of the head of the left-hand bolt and an inner panel 2 is narrowed, and the head of the left-hand bolt 5 comes into contact with the inner panel 2 to define a clearance between a body frame and the bracket 3 of a steering member. The bolt 4 is screwed into the left-hand bolt 5 and the base surface 11 of the bolt comes into contact with an outer panel 1 to produce a fastening force. The fastening force is transmitted through the left-hand bolt 5 to attach the steering member. A welded nut 6 may be omitted and an internal screw thread 15 with which the left-hand bolt engages may be formed in the bracket 14 of the steering member.

14 Claims, 10 Drawing Sheets

U.S. PATENT DOCUMENTS

| | | | | |
|---|---|---|---|---|
| 4,043,239 A | * | 8/1977 | DeFusco | 411/337 |
| 5,288,191 A | * | 2/1994 | Ruckert et al. | 411/432 |
| 6,357,953 B1 | * | 3/2002 | Ballantyne | 403/43 |
| 6,776,566 B2 | * | 8/2004 | Kobusch et al. | 411/546 |
| 6,779,957 B2 | * | 8/2004 | Ozawa et al. | 411/384 |
| 6,789,993 B2 | * | 9/2004 | Ozawa et al. | 411/546 |
| 6,884,014 B2 | * | 4/2005 | Stone et al. | 411/352 |
| 6,902,342 B1 | * | 6/2005 | Ditzler | 403/78 |

FOREIGN PATENT DOCUMENTS

| | | |
|---|---|---|
| DE | 43 14 431 | 11/1994 |
| EP | 0 768 468 | 4/1997 |
| JP | 8-128430 A | 5/1996 |
| JP | 8-334114 A | 12/1996 |
| JP | 11-117927 | 4/1999 |
| JP | 2002-347656 | 4/2002 |
| WO | 2002/10595 A2 | 2/2002 |

OTHER PUBLICATIONS

Patent Abstract of Japan Publication No. 08-334114 Published Dec. 17, 1996.

Patent Abstracts of Japan of JP 2002-347656 dated Apr. 12, 2002.

Patent Abstracts of Japan of JP 11-117927 dated Apr. 27, 1999.

* cited by examiner

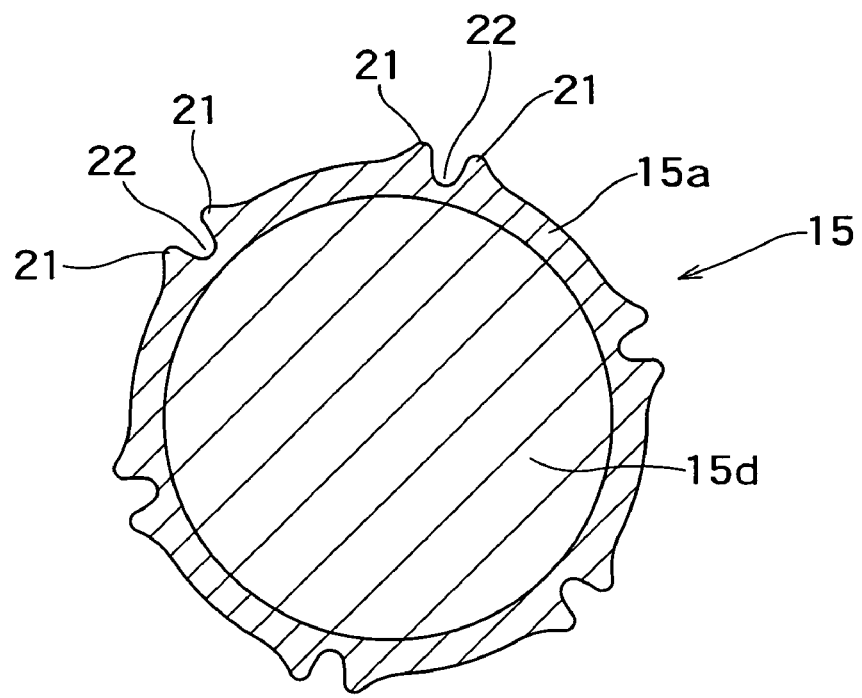
FIG. 5
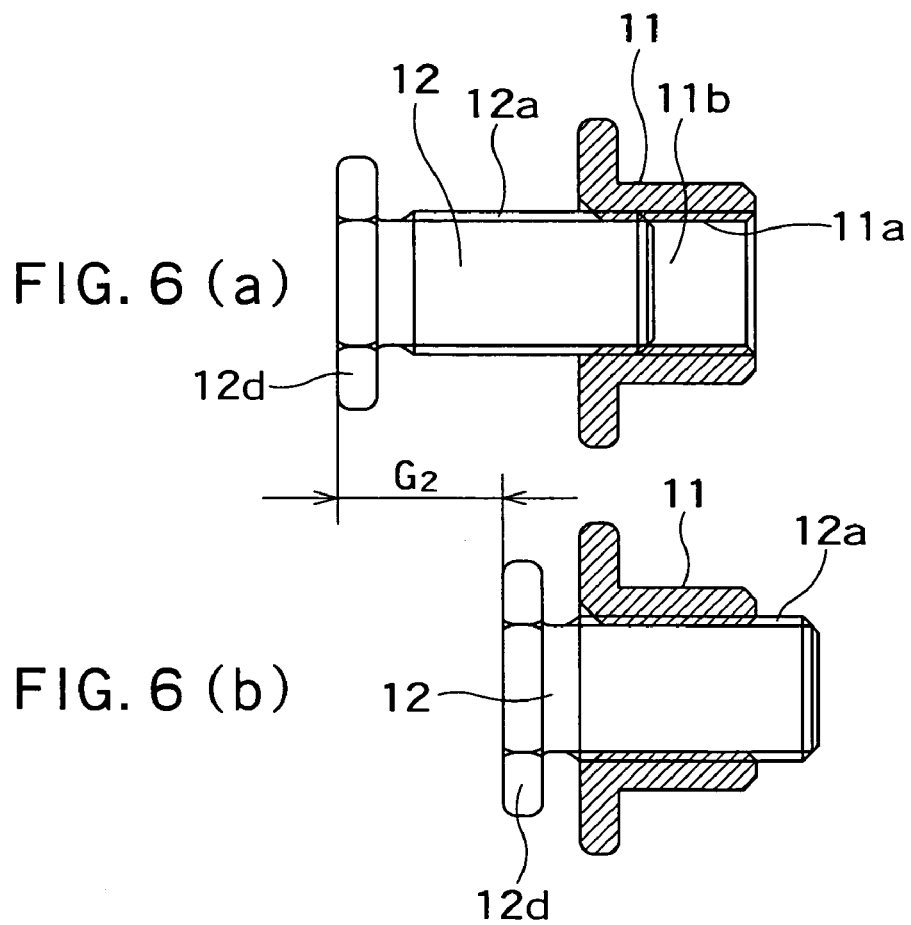
FIG. 6 (a)
FIG. 6 (b)

Prior Art

Prior Art

BOLT-NUT FASTENING MECHANISM

TECHNICAL FIELD

The present invention relates to a bolt-and-nut fastening mechanism for fastening a modular fixture, such as a steering member, to a body frame.

BACKGROUND ART

When a steering member as a modular fixture is attached to a body frame, the steering member is disposed relative to the body frame such that a clearance 110 is formed between the steering member and the body frame, and the steering member is attached to the body frame without changing the clearance 110.

FIGS. 11 to 13 show a bolt-and-nut fastening mechanism disclosed in Patent document 1. The bolt-and-nut fastening mechanism includes a nut 120 provided with an inverse internal screw thread 125 and a normal internal screw thread 126 having a pitch diameter smaller than that of the inverse internal screw thread 125, and welded to a steering member 117, a spacer 119 provided with an inverse external screw thread 124 capable of engaging with the inverse internal screw thread 125 of the nut 120, and a normal internal screw thread 123, and a bolt 118 capable of being passed through an opening formed in a body frame 116 and provided with a normal external screw thread 122 capable of engaging with the normal internal screw thread 124 of the spacer 119 and the normal internal screw thread 126 of the nut 120. The thread length of the normal external screw thread 122 of the bolt 118 is shorter than the length of the body of the bolt 118. An adhesive is applied to the normal external screw thread 122. The diameter of an unthreaded part 121 of the body of the bolt 118 is smaller than the inside diameter of the normal internal screw thread 123 of the spacer 119.

When the bolt 118 is turned in a fastening direction, the spacer 119 turns with the bolt 118 because the spacer 119 is bonded to the bolt 118 by the adhesive applied to the normal external screw thread 122. The inverse external screw thread 124 of the spacer 119 engages with the inverse internal screw thread 125 of the nut 120. Consequently, the spacer 119 moves toward the body frame 116 and the head of the spacer 119 comes into contact with and is pressed against the body frame 116. The spacer 119 keeps the clearance 110 between the steering member 117 and the body frame 116.

The bolt 118 is turned further in the fastening direction against the resistance of the adhesive by a torque exceeding a resistance resulting from the adhesive strength of the adhesive. Consequently, only the bolt 118 turns relative to the spacer 119. Then, the normal external screw thread 122 of the bolt 118 slides along the normal internal screw thread 123 of the spacer 119 and engages with the normal internal screw thread 126 of the nut 120. Then, the base surface 127 comes into contact with the body frame 116 and the nut 120 is fastened to the body frame 116 when the bolt 118 is turned further to screw the normal external screw thread 122 of the bolt 118 further into the normal internal screw thread 126 of the nut 120.

Patent document 1: JP 2002-347656 A
Patent document 2: JP 11-117927 A

Problem to be Solved by the Invention

When the bolt 118 is turned in the fastening direction, pressure is applied to the bolt 118 in a direction opposite a direction in which the spacer 119 is propelled. Thus the pressure applied to the bolt 118 acts against the movement of the spacer 119. Therefore, the spacer 119 must be bonded to the bolt 118 by a high locking force to enable the spacer 119 to turn with the bolt 118. Although the bolt-and-nut mechanism disclosed in Patent document 1 uses the bonding force of the adhesive as a locking force, this locking force is low.

In the bolt-and-nut mechanism disclosed in Patent document 1, thrust for thrusting the spacer 119 forward is produced by the bonding force of the adhesive applied to the normal external screw thread 122 of the bolt 118. Therefore, it is very possible that the bonding force of the adhesive varies with the amount of the adhesive applied to the normal external screw thread 122 of the bolt 118 and the temperature of environment in which assembling work is performed.

If the bonding force of the adhesive is low, it is possible that the spacer 119 cannot be propelled. In such a case, the clearance 110 changes, the steering ember 117 is pulled excessively toward the body frame 116 and the steering member 117 will be deformed.

The diameter of the unthreaded part 121 of the body of the bolt 118 must be smaller than the inside diameter of the inverse internal screw thread 123 of the spacer 119 to disengage the bolt 118 from the spacer 119. The nut 120 must be provided with the normal internal screw thread 126 with which the normal external screw thread 122 engages in addition to the normal internal screw thread 125. Consequently, the costs of the bolt 118 and the nut 120 are high.

The spacer 119 is combined previously with the nut 120. Since the nut 120 is provided with the inverse internal screw thread 125 with which the inverse external screw thread 124 of the spacer 119 engages and the normal internal screw thread 126 with which the normal external screw thread 122 of the bolt 118 engages, the lower end of the inverse internal screw thread 125 and the upper end of the normal internal screw thread 126 are on different levels, respectively. Consequently, the length of a part of the normal external screw thread 124 of the spacer 119 in engagement with the nut 120 is limited by the height of the nut 120. It is possible to increase the length of a part of the normal external screw thread 124 of the spacer 119 in engagement with the nut 120 by increasing the height of the nut 120 only when the clearance 110 between the body frame 116 and the steering member 117 is big and the length cannot be increased when the clearance 110 is small.

A part of a length of the inverse external screw thread 124 of the spacer 119 must be in engagement with the nut 120 after the clearance 110 has been fixed. This known bolt-and-nut mechanism is unable, in some cases, to engage a part of a necessary length of the inverse external screw thread 124 with the nut 120 and, therefore, it is possible that threads of the inverse external screw thread 124 of the spacer 119 or the inverse internal screw thread 125 of the nut 120 are sheared off when the bolt 118 is tightened up.

If the length of the clearance 110 is inaccurate, it is possible that the spacer 119 comes off the nut 120 as shown in FIG. 13.

It is expected that aluminum alloys and magnesium alloys will be used for forming the steering member 117, such as a bracket, to reduce the weight of the steering member 117. However, it is difficult to weld the nut 120 to the steering member 117 formed of an aluminum alloy or a magnesium alloy and hence the weight of the steering member 117 cannot be reduced.

When the steering member 117 needs to be electrically connected to the body frame for grounding, a grounding terminal is attached to the steering member 117, a portion of a paint film coating the body frame is removed to expose a part of the body frame, one end of a cable is fastened to the grounding terminal and the other end of the cable is fastened to the exposed part of the body frame with a bolt. Such a method of connecting the steering member and the body frame for grounding requires troublesome work.

Accordingly, it is an object of the present invention to solve those problems in the prior art and to provide a bolt-and-nut fastening mechanism including a bolt, a nut and a spacer, capable of locking the spacer to the bolt by a high locking force and of fastening a fixture to a frame such that a desired clearance is formed accurately between the fixture and the frame.

DISCLOSURE OF THE INVENTION

A bolt-and-nut fastening mechanism according to the present invention for attaching a fixture to a frame with a desired clearance formed between the fixture and the frame includes: an inverse internal screw thread having a uniform diameter and axially penetrating the fixture; a spacer provided with an inverse external screw thread capable of engaging with the inverse internal screw thread and a normal internal screw thread; a bolt provided with a normal external screw thread capable of engaging with the normal internal screw thread of the spacer and capable of being passed through an opening formed in the frame from the side of the outer surface of the frame and of being turned to engage the normal external screw thread thereof with the normal internal screw thread of the spacer; and a screwing restricting means for permitting only a threaded end part of the bolt to engage with the normal internal screw thread of the spacer and restraining a threaded back part of the bolt extending behind the threaded end part from engaging with the normal internal screw thread of the spacer when a torque not higher than a predetermined first threshold torque is exerted on the bolt, and permitting the threaded back part to engage with the normal internal screw thread of the spacer when a torque not lower than a predetermined second threshold torque is exerted on the bolt.

The bolt-and-nut fastening mechanism according to the present invention is characterized in that the screwing restricting means permits the spacer to move backward together with the bolt with the threaded end part of the bolt engaged with the normal internal screw thread of the spacer until the head of the spacer comes into contact with the inner side surface of the frame when a torque not higher than the first threshold torque is exerted on the bolt, permits the head of the spacer to be pressed against the inner side surface of the frame when a torque higher than the first threshold torque and lower than the second threshold torque is exerted on the bolt, and permits the threaded back part of the bolt to engage with the normal internal screw thread of the spacer so that the bolt advances with the head of the spacer pressed against the inner side surface of the frame when a torque not lower than the second threshold torque is exerted on the bolt.

The bolt-and-nut fastening mechanism according to the present invention is characterized in that the screwing restricting means includes a frictional resistance adjusting means for adjusting metal-to-metal frictional resistance exerted by the normal internal screw thread of the spacer on the normal external screw thread of the bolt screwed into the normal internal screw thread of the spacer.

The bolt-and-nut fastening mechanism according to the present invention is characterized in that the screwing restricting means includes projections formed in the surface of the normal external screw thread of the bolt.

The bolt-and-nut fastening mechanism according to the present invention is characterized in that the screwing restricting means includes projections formed in the surface of the normal internal screw thread of the spacer.

The bolt-and-nut fastening mechanism according to the present invention is characterized in that the respective magnitudes of the first threshold torque and the second threshold torque are adjustable by adjusting the height of the projections or the length of a range in which the projections are formed.

The bolt-and-nut fastening mechanism according to the present invention is characterized in that the projections are formed on the opposite sides of helical grooves twisting round an axis.

The bolt-and-nut fastening mechanism according to the present invention further includes a nut attached to the fixture and provided with the inverse internal screw thread.

The bolt-and-nut fastening mechanism according to the present invention is characterized in that the inverse internal screw thread is formed in the fixture.

The bolt-and-nut fastening mechanism according to the present invention is characterized in that the inverse external screw thread of the spacer can engage with the inverse internal screw thread with an end part of the spacer projecting from the inverse internal screw thread.

The bolt-and-nut fastening mechanism according to the present invention is characterized in that the end surface of the head of the spacer is provided with projections to increase friction between the end surface of the head of the spacer and the inner side surface of the frame.

The bolt-and-nut fastening mechanism according to the present invention is characterized in that the projections remove a paint film coating the inner side surface of the frame and come into contact with the inner side surface when the spacer is turned, and the spacer can electrically connect the fixture and the frame.

The bolt-and-nut fastening mechanism according to the present invention is characterized in that the body of the bolt has a uniform diameter and the normal external screw thread of the bolt is formed over the entire length of the body of the bolt.

In the bolt-and-nut fastening mechanism according to the present invention, the spacer moves backward together with the bolt until the head of the spacer comes into contact with the inner side surface of the frame when a torque not higher than the first threshold torque is exerted on the bolt, the head of the spacer is pressed against to the inner side surface of the frame to press the inner side surface outward when a torque higher than the first threshold torque and lower than the second threshold torque is exerted on the bolt, the head of the spacer is pressed firmly against the inner side surface of the frame and becomes unable to turn relative to the inner side surface of the frame, a back part of the normal external screw thread of the bolt engages the normal internal screw thread of the spacer, the bolt advances and the base surface of the head of the bolt is pressed against the outer side surface of the frame when a torque not lower than the second threshold torque is exerted on the bolt. Thus the bolt and the spacer are locked together by a high locking force, and the fixture can be attached securely to the frame by the bolt and the spacer with the clearance formed between the frame and the fixture.

The inverse internal screw thread of a uniform diameter axially penetrating the fixture may be formed in a nut attached to the fixture or in the fixture.

Since the inverse internal screw thread of a uniform diameter axially penetrates the fixture, the inverse external screw thread of the spacer can engage with the inverse internal screw thread with an end part of the spacer projecting from the inverse internal screw thread and hence the spacer can work in a wide working range.

Since the screwing restricting means is provided, for example, with the projections on an imaginary cylinder enveloping the normal external screw thread of the bolt, the metal-to-metal frictional resistance exerted by the normal internal screw thread of the spacer on the normal external screw thread of the bolt can be easily and surely adjusted by adjusting the height of the projections or the length of a range in which the projections are formed. The first threshold torque and the second threshold torque can be easily and surely determined.

EFFECT OF THE INVENTION

As apparent from the foregoing description, since the bolt-and-nut fastening mechanism according to the present invention includes the screwing restricting means capable of easily and surely determining the first threshold torque and the second threshold torque, the bolt and the spacer can be locked together by a high locking force and the bolt-and-nut mechanism is capable of forming the desired clearance between the fixture and the frame.

Since the fixture is provided with the inverse internal screw thread of a uniform diameter axially penetrating the fixture, the working range of the spacer is not subject to restrictions placed by the length of the nut and the length of the inverse internal screw thread.

The modular fixture can be easily electrically connected to the body frame.

BRIEF DESCRIPTION OF THE DRAWINGS

FIG. 5 is a cross-sectional view taken on the line A-A in FIG. 4;

FIG. 6 is a view of assistance in explaining a working range G2 in which the spacer works between a position in a state shown in FIG. 6(a) and a position in a state shown in FIG. 6(b);

BEST MODE FOR CARRYING OUT THE INVENTION

Bolt-and-nut fastening mechanisms in preferred embodiments according to the present invention will be described with reference to the accompanying drawings.

Figure 1:
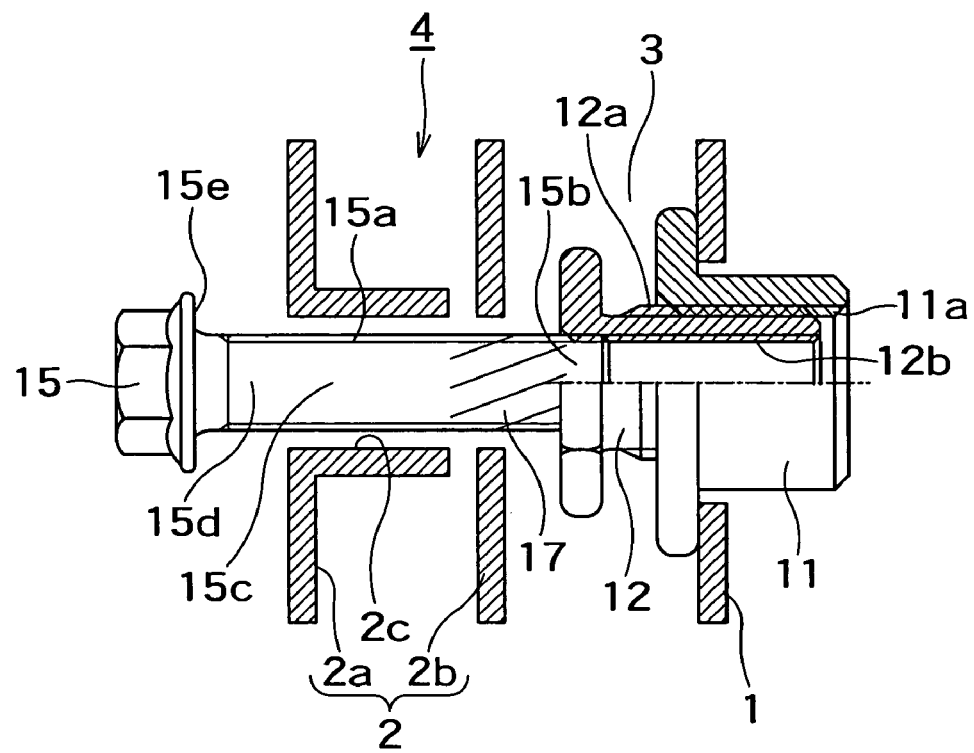
FIG. 1 is a view of a bolt-and-nut fastening mechanism in a first embodiment according to the present invention including a bolt, spacer and a nut in a state where a torque not higher than a first threshold torque is exerted on the bolt.
Figure 2:
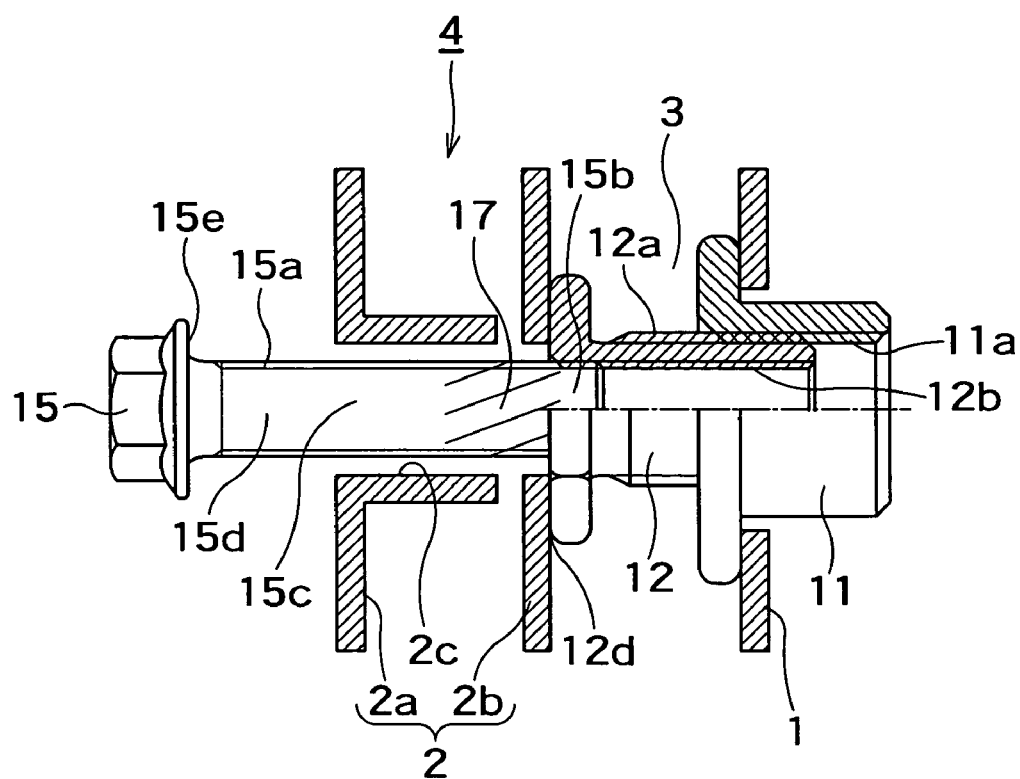
FIG. 2 is a view of the bolt-and-nut fastening mechanism according to the present invention in a state where the head of the spacer has come into contact with the inner panel of a body frame due to the continuous exertion of a torque not higher than the first threshold torque on the bolt.
Figure 3:
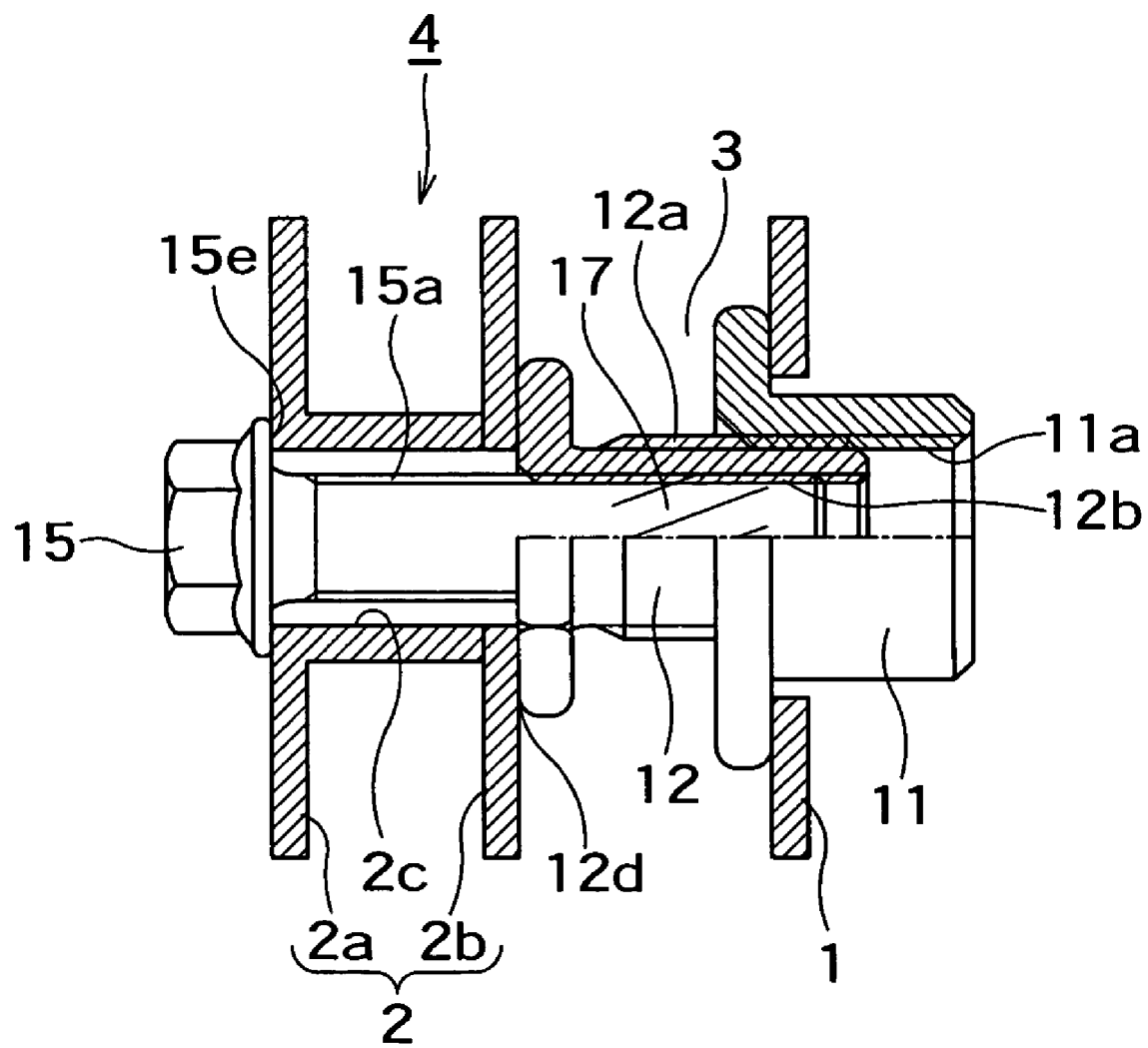
FIG. 3 is a view of a steering member attached to the frame with a desired clearance formed between the body frame and the steering member by exerting a torque not lower than the second threshold torque on the bolt.
Figure 4:
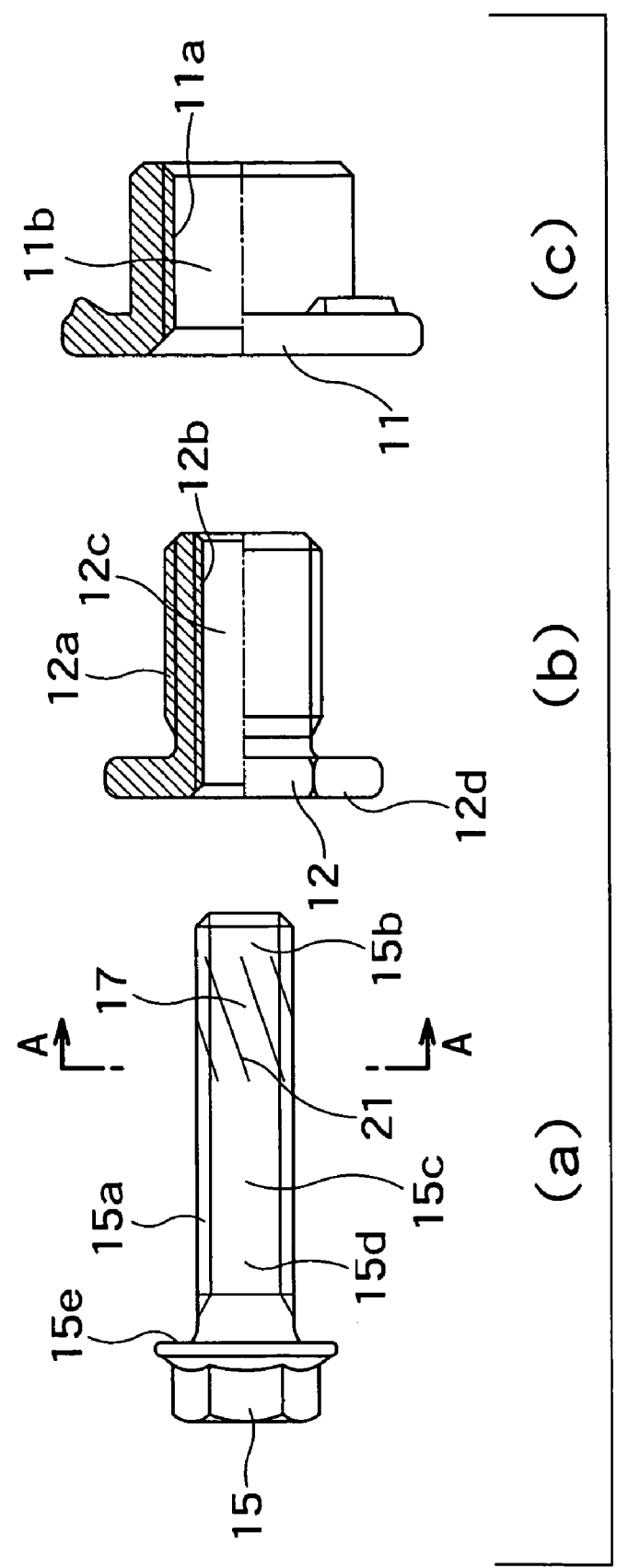
FIG. 4 is an exploded view of the bolt-and-nut fastening mechanism including the bolt (a), the spacer (b) and the nut (c)

FIG. 1 shows a bolt-and-nut fastening mechanism 4 for fastening a steering member 1, namely, a fixture, to a body frame 2 with a clearance 3 formed between the steering member 1 and the body frame 2. The body frame 2 has an outer panel 2a and an inner panel 2b and is provided with a hole 2c.

The bolt-and-nut fastening mechanism 4 includes a nut 11 welded beforehand to the steering member 1, a spacer 12 for defining the clearance 3, and a bolt 15 passed through the hole 2c.

The spacer 12 is combined beforehand with the steering member 1 before attaching the steering member 1 to the body frame 2. The bolt 15 is inserted in the hole 2c from the side of the outer panel 2a to fasten together the outer panel 2a, the inner panel 2b and the steering member 1. The clearance 3 is formed between the body frame 2 and the steering member 1 to facilitate assembling work. The spacer 12 defines the clearance 3 when the steering member 1 is attached to the body frame 2.

The nut 11 is provided with an inverse internal screw thread 11a. An axial through hole 11b of a uniform diameter is formed in the nut 11, and the inverse internal screw thread 11a is formed in the side surface of the through hole 11b.

The spacer 12 is provided with an inverse external screw thread 12a that engages with the inverse internal screw thread 11a of the nut 11. The spacer 12 is provided with an axial through hole 12c, and a normal internal screw thread 12b is formed in the side surface of the through hole 12c. Since the nut 11 is provided with the through hole 11b, an end part of the inverse external screw thread 12a of the spacer 12 can extend through the through hole 11b.

The bolt 15 is provided with a normal external screw thread 15a capable of engaging with the normal internal screw thread 12b of the spacer 12. The normal external screw thread 15a engages with the normal internal screw thread 12b of the spacer 12.

The normal external screw thread 15a is formed over the entire length of the body 15d of the bolt 15. The body 15d has a threaded end part 15b provided with the normal external screw thread 15a, a threaded middle part provided with a screwing restricting means 17, and a threaded back part 15c provided with the normal external screw thread 15a.

For example, when the bolt 15 is long, the end part 15b of the bolt 15 can extend through the through hole 12c of the spacer and the through hole 11b of the nut 11 because the spacer 12 is provided with the axial through hole 12c. Therefore, the bolt 15 can be formed in a sufficiently long length.

The screwing restricting means 17 of the bolt-and-nut fastening mechanism 4 permits only the threaded end part 12b of the bolt 15 to engage with the normal internal screw thread 12b of the spacer 12 and restrains the threaded back part 15c of the bolt 15 from engaging with the normal internal screw thread 12b of the spacer 12 when a torque not higher than a first threshold torque is exerted on the bolt 15, and permits the threaded back part 15c to engage with the normal internal screw thread 12b of the spacer 12 when a torque not lower than a predetermined second threshold torque is exerted on the bolt 15.

The screwing restricting means 17 adjusts the frictional resistance exerted by the normal internal screw thread 12b of the spacer 12 on the normal external screw thread 15a of the bolt 15 by metal-to-metal friction. Therefore, the bolt 15 and the spacer 12 can be locked together by a high locking force. The frictional resistance exerted by the normal internal screw thread 12b of the spacer 12 on the normal external screw thread 15a of the bolt 15 is adjusted such that only the threaded end part 15b of the bolt 15 can be screwed into the normal internal screw thread 12b of the spacer 12 when a torque lower than the first threshold torque is exerted on the bolt 15 and the normal external screw thread 15a can be entirely screwed into the normal internal screw thread 12b when a torque not lower than the second threshold torque is exerted on the bolt 15.

Since the frictional resistance exerted by the normal internal screw thread 12b of the spacer 12 on the normal external screw thread 15a of the bolt 15 is adjusted by metal-to-metal contact. For example, the screwing restricting means 17 includes projections 21 formed on an imaginary cylinder enveloping the normal external screw thread 15a of the bolt 15 as shown in FIG. 5. The projections 21 are formed by cutting grooves 22 in the normal external screw thread 15a so that parts of the normal external screw thread 15a on the opposite sides of the grooves 22 are raised. Thus, the projections 21 are formed by applying pressure locally to the crests of the normal external screw thread 15a to shift the volumes of the crests toward the flanks of the normal external screw thread 15a so that the flanks are raised to form the projections 21. Locking force is produced when the projections 21 come into engagement with the flanks of the normal internal screw thread 12b of the spacer 12. The locking force locks the bolt 15 and the spacer 12 together so that the spacer 12 turns together with the bolt 15 when a torque below the second threshold torque is exerted on the bolt 15.

For example, the projections 21 are formed on the third thread from the tip of the bolt 15 to one of the sixth to the eighth thread. Thus the projections 21 are formed in a range on the bolt 15 corresponding to an axial length in which three to four threads are formed.

The grooves 22 are helical grooves twisting round the axis of the bolt 15. The respective magnitudes of the first threshold torque and the second threshold torque are adjustable by adjusting the height of the projections 21 or the length of a range in which the projections 21 are formed. The height of the projections 21 is dependent on the pressure applied to the crests of the normal external screw thread 15a to form the grooves 22. The length of the range in which the projections 21 are formed is dependent on the number of threads of the normal external screw thread 15a to which the pressure is applied to form the grooves 22. For example, the magnitude of the first threshold torque is determined by selectively determining the height of the projections 21. The projections 21 formed on the first thread adjacent to the threaded end part 15b or on the first thread and several threads following the first thread obstruct the engagement of the normal external screw thread 15a with the normal internal screw thread 12b.

The magnitude of the second threshold torque greater than that of the first threshold torque is determined by selectively determining the length of the range in which the projections 21 are formed. Thus the normal external screw thread 15a cannot be screwed into the normal internal screw thread 12b when a torque higher than the first threshold toque and not hither than the second threshold torque is exerted on the bolt 15. The normal external screw thread 15a can be screwed into the normal internal screw thread 12b only when a torque higher than the second threshold torque is exerted on the bolt 15.

Figure 10:
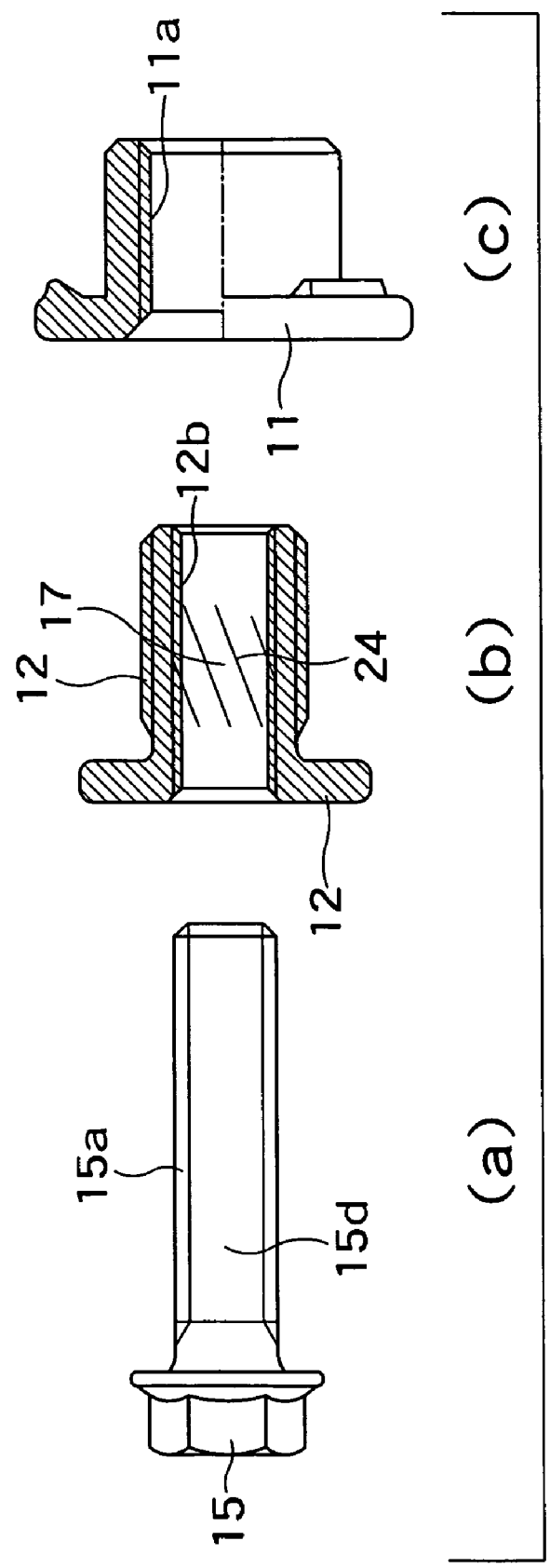
FIG. 10 is an exploded view of a bolt-and-nut fastening mechanism in a fourth embodiment according to the present invention including a bolt (a), a spacer (b) and a nut (c)
Figure 11:
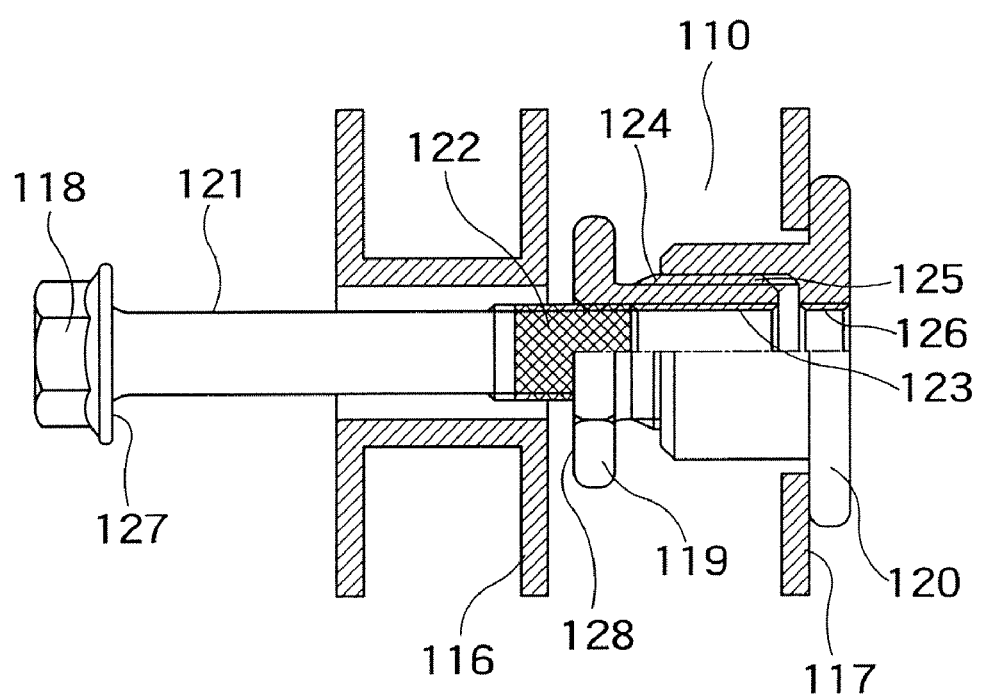
FIG. 11 is a view of a prior art bolt-and-nut fastening mechanism.
Figure 12:
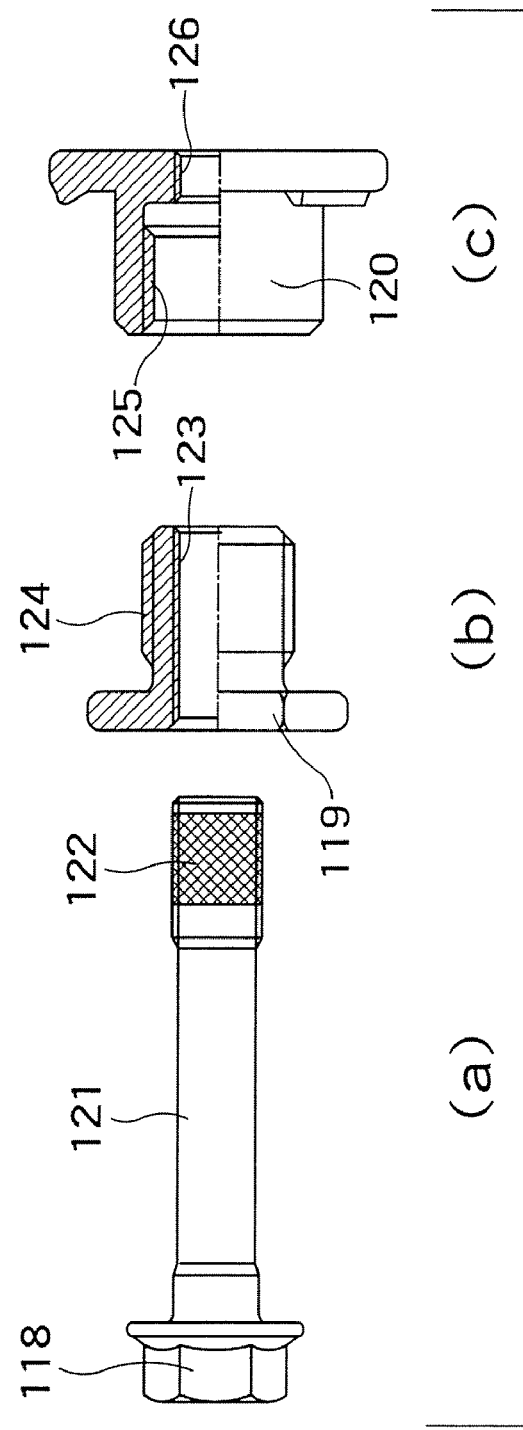
FIG. 12 is an exploded view of the prior art bolt-and-nut fastening mechanism including a bolt (a), a spacer (b) and a nut (c)

Projections 24 may be formed by forming grooves 23 in an imaginary cylinder touching the normal internal screw thread 12b of the spacer as shown in FIG. 10 instead of forming the projections 21 on the normal external screw thread 15a of the bolt 15.

Functions of the bolt-and-nut fastening mechanism 4 will be described.

Only the threaded end part 15b of the bolt 15 is screwed into the normal internal screw thread 12b of the spacer 12 when a torque not higher than the first threshold torque is exerted on the bolt 15 because the normal external screw thread 15a of the bolt 15 is provided with the projections 21. Since the bolt 15 cannot be further screwed into the normal internal screw thread 12b by the torque, the spacer 12 provided with the inverse external screw thread 12a in engagement with the inverse internal screw thread 11a of the nut 11 turns together with the bolt 15. Consequently, the bolt 15 and the spacer 12 move together backward, i.e., in a direction toward the body frame 2. The spacer 12 moves away from the nut 11 until the head 12d thereof comes into contact with the inner panel 2b of the body frame 2. Finally, the head 12d of the spacer 12 comes into contact with the inner panel 2b.

Then, a torque higher than the first threshold torque and lower than the second threshold torque is exerted on the bolt 15. Thus the head 12d of the spacer 12 is pressed firmly against the inner panel 2b because the head 12d of the spacer 12 is in contact with the inner panel 2b and the spacer 12 is unable to move further backward together with the bolt 15.

Then, a higher torque not higher than the second threshold torque is exerted on the bolt 15 to press the head 12d of the spacer 12 more firmly against the inner panel 2b. Since this torque exerted on the bolt 15 is lower than the second threshold torque, the spacer 12 is pressed backward and force acting on the steering member 11 in a direction to push the steering member 1 away from the inner panel 2b increases.

The bolt 12 can be turned relative to the spacer 12 by exerting a torque not lower than the second threshold torque on the bolt 15. Thus only the bolt 15 advances in a state where the head 12d of the spacer 12 is pressed against the inner panel 2b. When the torque not lower than the second threshold torque is exerted on the bolt 15, the torque overcomes the resistance exerted on the bolt 15 against the turning of the bolt 15 and the threaded back part 15c provided with the normal external screw thread 15a can be screwed into the normal internal screw thread 12b of the spacer 12. Thus the bolt 15 advances and the base surface 15e comes into contact with the outer panel 2a. Then, the torque is exerted further on the bolt 15 to fasten the steering member securely to the body frame 2 by a high force.

A working range G2 in which the spacer 12 of the bolt-and-nut fastening mechanism 4 works will be described with reference to FIG. 6.

As mentioned above, the nut 11 is provided with the axial through hole 11b of a uniform diameter, and the inverse internal screw thread 11a is formed in the side surface of the through hole 1ib. An end part of the spacer 12 provided with the inverse external screw thread 12a is able to project from the nut 11 provided with the through hole 11b as shown in FIG. 6(b). FIG. 6(b) shows a state where the head 12d of the spacer 12 is separated from the inner panel 2b and the clearance 3 is not secured yet. FIG. 6(a) shows a state where the head 12d of the spacer is pressed against the inner panel 2b and the clearance 3 is secured. In the state shown in FIG. 6(a), the shortest necessary length of the inverse external screw thread 12a of the spacer 12 for securing a force necessary for ensuring the firm engagement of the inverse external screw thread 12a of the spacer 12 and the inverse internal screw thread 11a of the nut 11 may be in engagement with the inverse internal screw thread 11a of the nut 11. The threads of the inverse external screw thread 12a of the spacer 12 and the inverse internal screw thread 11a of the nut 11 will not be sheared off when the inverse external screw thread 12a and the inverse internal screw thread 11a are engaged as shown in FIG. 6(a). Thus the spacer 12 is able to move in the working range G2 between the positions of the spacer 12 respectively shown in FIGS. 6(a) and 6(b). Since the nut 11 is provided with the through hole 11b of a uniform diameter, the spacer 12 is able to move in the wide working range G2 without being restricted by the length of the nut 11. Since the normal external thread 15a is formed on the entire body of the bolt 15, the bolt 15 is able to move the spacer 12 in the wide working range G2. Since the nut 11 needs to be provided with only the inverse internal screw thread 11a, the nut 11 can be manufactured at a low manufacturing cost.

Figure 13:
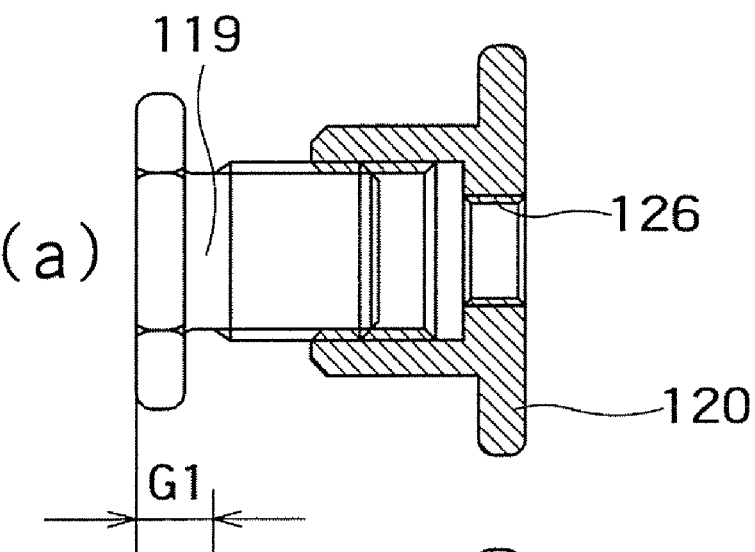
FIG. 13 is a view of assistance in explaining a working range G1 in which the spacer works between a position in a state shown in FIG. 13(a) and a position in a state shown in FIG. 13(b).
Figure 13:
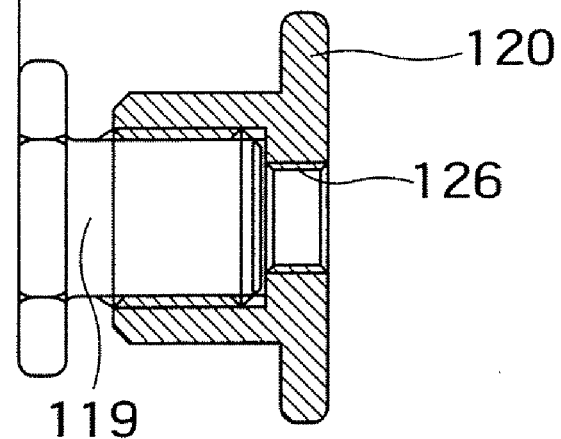

In the nut 120 of the prior art bolt-and-nut fastening mechanism, there is a step between the lower end of the inverse internal screw thread 125 and the upper end of the normal internal screw thread 126 as shown in FIGS. 13(a) and 13(b). Therefore, the working range G1 in which the spacer 119 is able to move with the inverse external screw thread 124 in engagement with the inverse internal screw thread 125 of the nut 120 is restricted by the height of the nut 120. Since the nut 120 needs to be provided with the normal internal screw thread 126 in addition to the inverse internal screw thread 125, the manufacturing cost of the nut 120 is high.

In the bolt-and-nut fastening mechanism 4 embodying the present invention, the screwing restricting means 17 adjusts the frictional resistance exerted by the normal internal screw thread 12b of the spacer 12 on the normal external screw thread 15a of the bolt 15 by metal-to-metal friction. Therefore, the bolt 15 is able to produce a high axial force, the clearance 3 can be secured and the steering member 1 can be firmly fastened to the body frame 2 by the bolt 15 and the spacer 12.

Since the screwing restricting means 17 has the projections formed in the threads of the normal external screw thread 15a of the bolt 15, respective desired magnitudes of the first and the second threshold torque can be easily and accurately determined by properly adjusting the height of the projections 21 or the length of the range in which the projections 21 are formed.

Since the nut 11 is provided with the axial through hole 11b of a uniform diameter, the spacer 12 can be moved in the wide working range G2 without depending on the length of the nut 11 or the length of the inverse internal screw thread 11a.

A bolt-and-nut fastening mechanism in another embodiment according to the present invention will be described with reference to FIG. 9.

Figure 9:
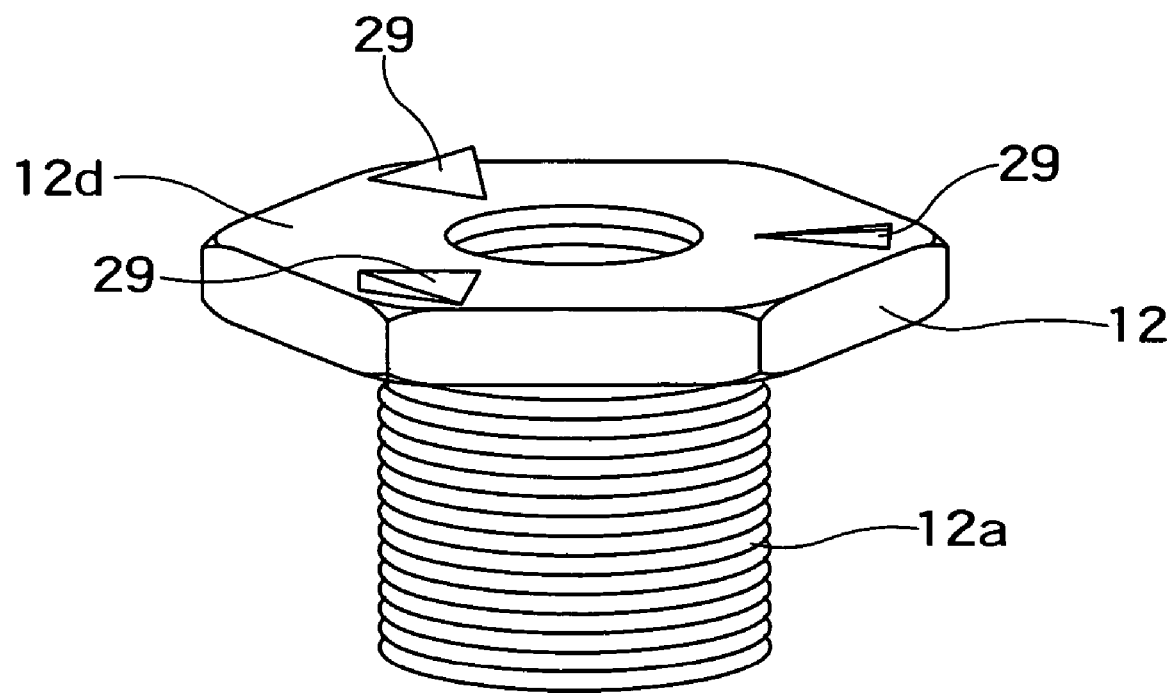
FIG. 9 is a view of a spacer included in a bolt-and-nut fastening mechanism in third embodiment according to the present invention.

Referring to FIG. 9, the head 12d of a spacer 12 is provided with projections 29 in its end surface to increase friction between the inner panel 2b and the head 12d of the spacer 12. For example, three projections 29 are arranged at equal angular intervals. For example, the projections 29 have a shape resembling a triangular pyramid and are formed so that the edges thereof are on the upper side. When a torque is exerted on a bolt 15 after the base surface 15e of the head of the bolt 15 has been seated on the outer panel 2a, sufficient friction is produced between the head 12d of the spacer 12 and the inner panel 2b. The spacer 12 stops turning upon the contact of the head 12d of the spacer 12 with the inner panel 2b, and the steering member 1 can be fastened firmly to the body frame 2 by a tensile force produced by the bolt 15.

Other effects of the projections 29 will be described.

When the spacer 12 is turned to attach a modular fixture, such as the steering member 1, to the body frame 2, the sharp edges of the projections 29 scrapes off a paint film coating the surface of the inner panel 2b and the surface of the inner panel 2b of a metal is exposed. Consequently, the projections 29 of the spacer 12 of a metal are electrically connected to the inner panel 2b. Thus the steering member 1 and the body frame 2 are electrically connected through electrical contact between the body frame 2 of a metal and the nut 11 of a metal, electrical contact between the nut and the side wall of the spacer of a metal and electrical contact between the projections 29 of the spacer 12 and the exposed surface of the inner panel 2b.

Consequently, an electric charge accumulated on the modular fixture, such as the steering member 1, can be dissipated into the earth through the spacer 12 and the inner panel 2b. In the conventional bolt-and-nut fastening mechanism, a grounding terminal is attached to a modular fixture, such as the steering member 1, and a grounding wire connected to the grounding terminal is fastened to the body frame to connect the modular fixture to the body frame for grounding. The spacer 12 provided with the projections 29 omits such troublesome grounding work, and facilitates the electrical connection of the modular fixture, such as the steering member 1, and the body frame.

Figure 7:
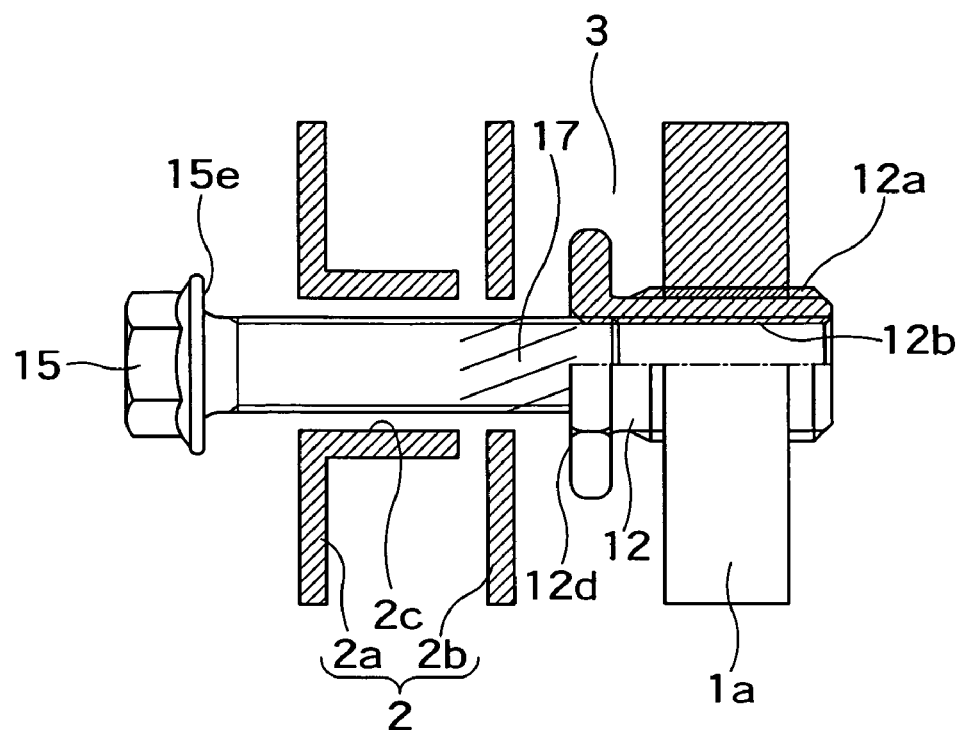
FIG. 7 is a view of a bolt-and-nut fastening mechanism in a second embodiment according to the present invention, in which any nut is not welded to a steering member and an inverse internal screw thread with which an inverse external screw thread formed in a spacer engages is formed in the bracket of the steering member.
Figure 8:
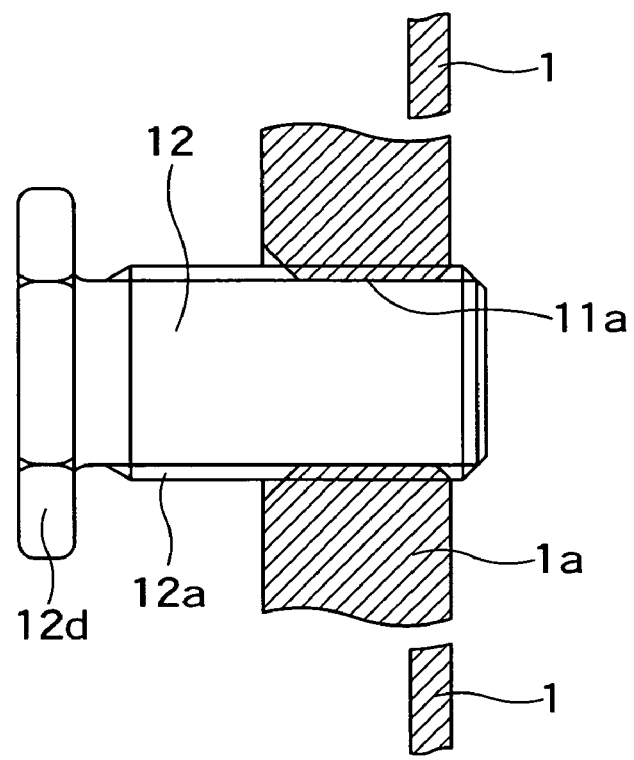
FIG. 8 is a view of the bracket, provided with an inverse internal screw thread with which an inverse external screw thread formed in a spacer engages is formed, of a steering member.

A bolt-and-nut fastening mechanism in a third embodiment according to the present invention will be described with reference to FIGS. 7 and 8.

The bolt-and-nut fastening mechanism shown in FIG. 1 includes the nut 11 previously welded to the steering member 1. The bolt-and-nut fastening mechanism in this embodiment does not include any member corresponding to the nut 11. The steering member 1 has a bracket 1a provided with an inverse internal screw thread 11a. When it is difficult to weld the nut 11 to the steering member 1, the nut 11 is omitted and the inverse internal screw thread 11a is formed in the bracket 11a of the steering member 1.

When the bracket 1a is formed of an aluminum alloy or a magnesium alloy to form the steering member 1 in a small weight, it is difficult to weld the nut 11 to the bracket 1a. In such a case, the inverse internal screw thread 11a is formed in the bracket 1a of the steering member 1 instead of welding the nut 11 provided with the inverse internal screw thread 11a to the bracket 1a.

The invention claimed is:

1. A bolt-and-nut fastening mechanism for attaching a fixture to a frame with a desired clearance formed between the fixture and the frame, said bolt-and-nut fastening mechanism comprising:

a nut provided with an inverse internal screw thread having a single axial through hole, the single axial through hole having a single diameter and a single cylindrical shape over a whole of the single axial through hole;

a spacer provided with an inverse external screw thread capable of engaging with the inverse internal screw thread, and a normal internal screw thread;

a bolt provided with a normal external screw thread capable of engaging with the normal internal screw thread of the spacer, and capable of being passed through an opening formed in the frame from the side of the outer surface of the frame and of being turned to engage the normal external screw thread thereof with the normal internal screw thread of the spacer; and screwing restricting means for permitting only a threaded end part of the bolt to engage with the normal internal screw thread of the spacer and restraining a threaded back part of the bolt extending behind the threaded end part from engaging with the normal internal screw thread of the spacer when a torque not higher than a predetermined first threshold torque is exerted on the bolt, and permitting the threaded back part to engage with the normal internal screw thread of the spacer when a torque not lower than a predetermined second threshold torque is exerted on the bolt, wherein the inverse external screw thread of the spacer can engage with the inverse internal screw thread with an end part of the spacer projecting from the inverse internal screw thread, and while the torque not higher than the predetermined first threshold torque is exerted on the bolt, the bolt advances into the spacer and then the bolt stops advancing into the spacer and retracts together with the spacer from the nut until the spacer contacts the frame, and while further the torque not lower than the predetermined second threshold torque is exerted on the bolt, the bolt advances into the spacer and the bolt presses the spacer against the frame by threading the normal external screw thread of the bolt with the normal internal screw thread of the spacer.

2. The bolt-and-nut fastening mechanism according to claim 1, wherein the screwing restricting means permits the spacer to move backward together with the bolt with the threaded end part of the bolt engaged with the normal internal screw thread of the spacer until the head of the spacer comes into contact with the inner side surface of the frame when a torque not higher than the first threshold torque is exerted on the bolt, permits the head of the spacer to be pressed against the inner side surface of the frame when a torque higher than the first threshold torque and lower than the second threshold torque is exerted on the bolt, and permits the threaded back part of the bolt to engage with the normal internal screw thread of the spacer so that the bolt advances with the head of the spacer pressed against the inner side surface of the frame when a torque not lower than the second threshold torque is exerted on the bolt.

3. The bolt-and-nut fastening mechanism according to claim 1, wherein the screwing restricting means includes a frictional resistance adjusting means for adjusting metal-to-metal frictional resistance exerted by the normal internal screw thread of the spacer on the normal external screw thread of the bolt screwed into the normal internal screw thread of the spacer.

4. The bolt-and-nut fastening mechanism according to claim 1, wherein the screwing restricting means includes projections formed in the surface of the normal external screw thread of the bolt.

5. The bolt-and-nut fastening mechanism according to claim 1, wherein the screwing restricting means includes projections formed in the surface of the normal internal screw thread of the spacer.

6. The bolt-and-nut fastening mechanism according to claim 4, wherein the respective magnitudes of the first threshold torque and the second threshold torque are adjustable by adjusting the height of the projections or the length of a range in which the projections are formed.

7. The bolt-and-nut fastening mechanism according to claim 4, wherein the projections are formed on the opposite sides of helical grooves twisting around an axis.

8. The bolt-and-nut fastening mechanism according to claim 1, further comprising a nut attached to the fixture and provided with the inverse internal screw thread.

9. The bolt-and-nut fastening mechanism according to claim 1, further comprising the fixture, wherein the inverse internal screw thread is formed in the fixture.

10. The bolt-and-nut fastening mechanism according to claim 1, wherein the end surface of the head of the spacer is provided with projections to increase friction between the end surface of the head of the spacer and an inner side surface of a frame.

11. The bolt-and-nut fastening mechanism according to 10, wherein the projections remove a paint film coating the inner side surface of the frame and come into contact with the inner side surface when the spacer is turned, and the spacer can electrically connect the fixture and the frame.

12. The bolt-and-nut fastening mechanism according to claim 10, wherein the body of the bolt has a uniform diameter and the normal external screw thread of the bolt is formed over the entire length of the body of the bolt.

13. The bolt-and-nut fastening mechanism according to claim 5, wherein the respective magnitudes of the first threshold torque and the second threshold torque are adjustable by adjusting the height of the projections or the length of a range in which the projections are formed.

14. The bolt-and-nut fastening mechanism according to claim 5, wherein the projections are formed on the opposite sides of helical grooves twisting around an axis.

* * * * *